Sept. 30, 1941.  W. BEHM ET AL  2,257,324
VEHICLE JACK
Filed Sept. 16, 1940  2 Sheets-Sheet 1
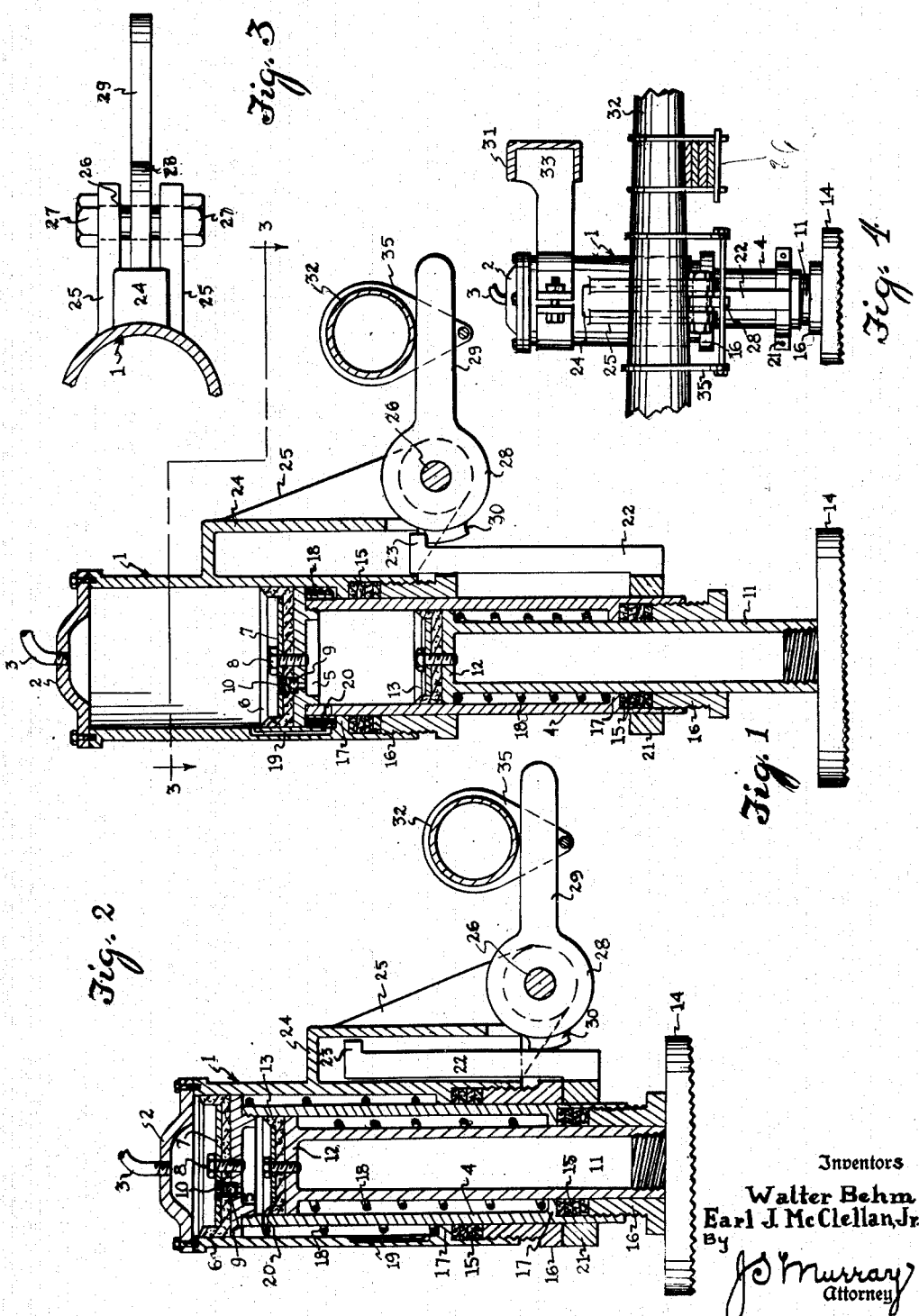
Inventors
Walter Behm
Earl J. McClellan, Jr.
By
J S Murray
Attorney

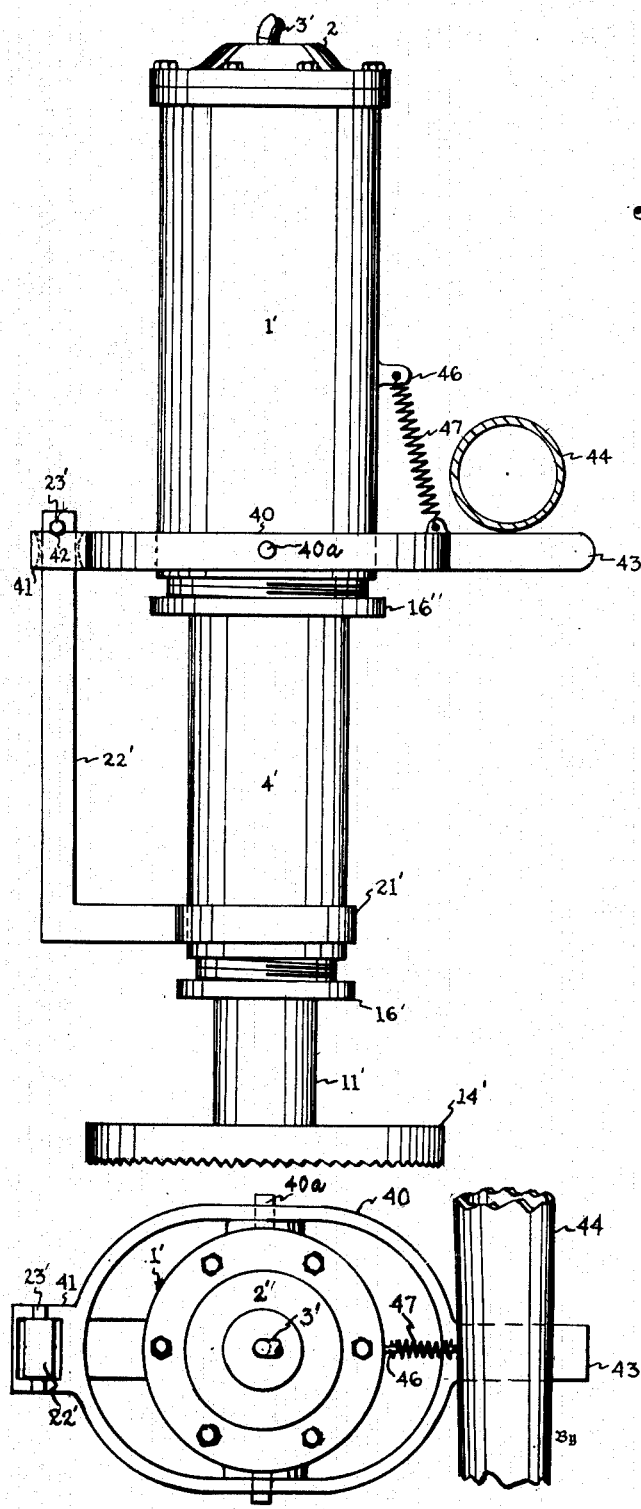

Patented Sept. 30, 1941

2,257,324

UNITED STATES PATENT OFFICE 2,257,324

VEHICLE JACK

Walter Behm, Rochester, and Earl J. McClellan, Jr., Utica, Mich.

Application September 16, 1940, Serial No. 356,914

17 Claims. (Cl. 254—86)

This invention relates to vehicle jacks and particularly jacks suited for permanent installation on vehicles.

In equipping vehicles with jacks and permanently installing the latter in positions of use, the problem arises of locating the jacks at a height adequate for proper normal ground clearance despite limitations imposed by the body and other parts of the vehicle. One of the factors tending to increase requisite vertical lift of a vehicle jack is the tendency of the vehicle springs and axle to sag materially when relieved of load. If the jack is arranged to take effect directly on an axle the factor mentioned is, of course, eliminated, but in permanently installing a jack in its use position, ground clearance requirements render direct application of lift to the axle impractical, at least on numerous types of vehicles.

An object of the invention is to install a jack in permanent lift-applying relation to a vehicle frame, and to adapt the jack, when being extended, to exercise an axle-supporting function, so as to avoid material sagging of the axle and load-transmitting springs, thus minimizing requisite vertical lift.

Another object is to form a jack for aforesaid purpose of telescoping sections, normally housed one within another in a raised position, and adapted to be lowered responsive to applied fluid pressure, and to avoid imposing effective fluid pressure on the ground-engaging section of the jack until a mid section has fully responded to such pressure, travel of such mid section being utilized to render a support effective on an axle adjacent to the jack.

These and various other objects the invention attains by the construction hereinafter described and illustrated in the accompanying drawings, wherein:

Fig. 1 is a vertical sectional view of the extended and loaded jack.

Fig. 2 is a similar view of the jack as retracted to its normal position of non-use.

Fig. 3 is a fragmentary horizontal sectional view of the jack, particularly showing the pivoting on the upper jack section of an axle-supporting arm.

Fig. 4 is an elevational view of the raised or collapsed jack, as viewed transversely to the adjacent axle.

Fig. 5 is a view similar to Fig. 1 but showing a modified construction.

Fig. 6 is a top plan view of the modification.

In these views, the reference character 1 designates the cylindrical upper section of a telescoping sectional jack, said section having its upper end closed by a detachable head 2 through which a hose or pipe 3 opens for delivering compressed air or some other pressure fluid.

Slidingly engaged within the section 1 and projecting variably below such section is a cylindrical mid section 4 closed at its upper end by a detachable head 5 slightly exceeding the section 4 in diameter. A cup leather 6 secured upon the head 5 by a metal disk 7 and bolt 8 is marginally upturned for sealing contact with the section 1 and an air passage through said head is normally closed by a check valve 9 downwardly seated by a coiled spring 10.

Slidably engaged in and variably projecting below the section 4 is a bottom cylindrical section 11 permanently closed at its upper end by a head 12 of slightly greater diameter than the section 11 and carrying a cup leather 13 marginally upturned for sealing engagement with said section, the lower end of said bottom section being equipped with a suitable base 14 for the jack.

Within the lower portions of the sections 1 and 4, packing 15 is compressed around the inserted sections, by annular gland nuts 16, such packing being upwardly seated against annular ribs 17 rigidly interiorly carried by said sections 1 and 4. These ribs further form abutments for the lower ends of coiled springs 18 compressed between the ribs and heads 5 and 12 and tending thus to normally raise the sections 4 and 11 to position shown in Fig. 2, disposing them both within the section 1.

When the mid section of the jack is in its lowermost position (Fig. 1), it uncovers the upper end of a fluid by-pass 19 formed in the wall of the section 1 and having its lower or outlet end opening into the section 1 slightly above the rib 17 of the latter. A port 20 is so formed in the upper portion of the mid section as to be disposed slightly above said rib in the described position of said section.

Clamped upon the lower end portion of the mid section is a collar 21 from which there projects rigidly upwardly a post 22, so spaced outwardly from said section as to substantially clear the upper section and extend exteriorly adjacent to the latter when the mid section is raised. Said post has a lug 23 outwardly projecting from its upper end and it is preferred to form the upper section with a vertically elongated, open-bottomed housing 24 to receive said post and lug when the mid section is raised. A pair of parallel spaced arms 25 secured to the upper end portion of the housing 24 project rigidly downwardly therefrom at an outward inclination to mount a shaft 26, preferably clamped in said arms by nuts 27. Journaled on said shaft between the arms 25 is an enlarged circular end portion 28 of an axle-supporting arm 29, projecting outwardly from the jack and normally substantially horizontal. A lug 30 peripherally formed on the end portion 28 is engageable in the lowermost position of the mid section by the lug 23 to restrain the arm 29 from downward swinging.

In installing the described jack on a vehicle, the upper section is clamped in any suitable manner upon the frame 31 of the vehicle, with the free end portion of the arm 29 engaging beneath an axle 32 of the vehicle. As illustrated a block 33 is secured within and projecting from the channel of the frame 31 and the section 1 is clamped to said block by a yoke 34. The arm 29 is upwardly held against the axle by a saddle member 35 clamped on and depending from the axle, affording the arm freedom to slide transversely of the axle and rock about the pivotal end of the arm. A leaf spring 36 transmits load from frame 31 to axle 32 as in common practice.

Preferably one of the described jacks will be permanently associated with each end portion of each axle of a vehicle, such arrangement not being illustrated, however, since it is broadly old in this art.

In use of described jack, when compressed air or other pressure fluid is admitted through duct 3 to the section 1, the spring 18 normally raising the mid section of the jack is overcome and the mid section assumes its lowered position shown in Fig. 1. The post 22 is carried downwardly with the mid section assuming a position (Fig. 1) interengaging the lugs 23 and 30. This restrains the axle-supporting arm from downward swinging and assures that the axle 32 will not be materially lowered by sagging of the adjacent vehicle spring, when latter is relieved of load by the jack. Uncovering of the by-pass 19 upon lowering of the mid section admits the energizing fluid by port 20 to upper portion of said section, whereby the spring 18 normally raising the bottom jack section is overcome and the latter descends to engage base 14 with the ground, pavement, or floor. When air is permitted to vent from the upper section, the check valve 9 opens to effect venting of the mid section, and the springs 18 restore the two extended sections to their normal raised positions.

It will be noted that the arm 29 is perfectly free to rock, when the jack is raised, so as to avoid interference with free relative vertical play of the frame and axle.

In the modification disclosed in Figs. 5 and 6, the parts 1', 2', 3', 4', 11', 14', 16', 21' and 22' conform substantially to the corresponding parts above described, no housing being provided however, for the post 22', which carries at its upper end a fixed pin 23' projecting from opposite sides of the post. A lever member, comprising an approximately elliptical loop 40, is pivoted by pins 40a substantially on the shorter axis of such ellipse to the lower portion of the cylinder 1' which projects upwardly therethrough having ample clearance from the ends of said loop for pivotal movement of the lever. Preferably integrally formed at one end of the lever is an apertured guide member 41 through which freely projects said post 22', the pin 23' on such post resting when the jack is extended, in grooves 42 formed in the upper face of the guide member 41. Such guide member, by restraining the post 22' from lateral movement, prevents the cylinder 4' from rotating.

From the opposite end of the loop 40 in a plane substantially parallel with that of the loop extends an axle-supporting bar 43 which lifts and/or supports a vehicle axle 44 in raised position, when the jack is extended. Depending from a lug 46 projecting from the upper portion of the section 1', is a spring 47 engaging said bar 43 to restrain the bar from downward swinging.

The inner mechanism and operation of the cylinders 1', 4', and 11' of the modification correspond to that of the first described construction. As the cylinder 4' descends, the pin 23' on the upper end of the post 22' engages the lever 41, 40, 43 at 41, holding such lever in axle-supporting position and thus preventing lowering of the axle due to sagging of a vehicle's springs when the frame of such vehicle is raised by the jack.

The prevention of sagging of the springs and consequent lowering of the axle is highly desirable, since in absence of such prevention, a greater lift would be required of the jack, and this would necessitate longer sections, and materially increase difficulty of installing the jack permanently in limited space available. In some prior constructions, it has been proposed to swing a permanently installed jack normally to a horizontal position, but such complication becomes unnecessary when sagging of the springs is prevented.

The described by-pass provision assures lowering of the mid section to its position exercising restraint on the axle-supporting arm before the bottom section is extended. This assures that the axle will be afforded support before the jack becomes operative to relieve the vehicle springs of load.

The invention is presented as including all such changes and modifications as come within the scope of the following claims.

What we claim is:

1. A jack installed on a vehicle having an unsprung lower portion and a sprung upper portion, said jack comprising an upper hollow cylindrical section, means for attaching such section to the sprung portion of the vehicle, a section slidable within said upper section from a raised idle position to a lowered lifting position, a spring reacting between said sections to normally maintain the raised position of the sliding section, means for delivering a pressure fluid to the upper section to react between the two sections for lowering the sliding section, an arm pivotally mounted on the sprung portion of the vehicle and engageable at one side of its pivot beneath the unsprung portion of the vehicle to resist sagging of the unsprung portion, and means carried by the sliding section engageable with said arm in a lowered position of the sliding section to maintain the arm in its effective position.

2. A jack as set forth in claim 1, said arm-engaging means consisting of a post secured to the lower portion of said sliding section and upwardly projecting in an outwardly spaced relation to the sliding section, such as to clear the upper section, said post having a projection on its upper end for operatively engaging the pivotal arm.

3. In a jack as set forth in claim 1, a pivotal support for said arm carried by the lower portion of the upper section.

4. In a vehicle jack as set forth in claim 1, said arm-engaging means consisting of a post secured to the lower portion of the sliding section, and upwardly projecting in an outwardly spaced relation to the sliding section such as to clear the upper section, said post having a projection on its upper end for operatively engaging the pivotal arm, and a housing exteriorly carried by the upper section and receiving said post in the raised position of the sliding section.

5. In a jack as set forth in claim 1, said arm-engaging means consisting of a post secured to the lower portion of the sliding section, and upwardly projecting in an outwardly spaced relation to the sliding section such as to clear the upper section, said post having a projection on its upper end for operatively engaging the pivotal arm, a housing exteriorly carried by the upper section and receiving said post in the raised position of the sliding section, a shaft pivoting said arm, and a pair of spaced supports for said shaft attached to said housing at opposite sides thereof and extending downwardly and outwardly from the housing to receive the shaft.

6. A vehicle jack comprising an upper hollow cylindrical section, means for attaching such section to a sprung portion of a vehicle, a hollow cylindrical mid section slidable within the upper section from a raised idle position to a lowered lifting position, said section having a head at its upper end in fluid-sealed engagement with the upper section, a bottom section slidable in the mid section from a raised idle position to a lowered lifting position, springs effective on the sliding sections to normally maintain their raised positions, means for delivering a pressure fluid to the upper section to react between the upper section and said head for lowering the mid section, means effective in the lowered position of the mid section for establishing a fluid flow from the upper section to the interior of the mid section to effect subsequent lowering of the bottom section, and means including an actuating element connected to the mid section for resisting sagging of an unsprung portion of the vehicle when the mid section is lowered.

7. A vehicle jack as set forth in claim 6, said means for establishing a fluid flow to the mid section consisting of a by-pass carried by the upper section and having an inlet and an outlet vertically spaced to afford positioning of said head between the inlet and outlet in the lowered position of the mid section, and a port in the upper part of the mid section for admitting by-passed fluid to the interior of the mid section.

8. In a vehicle jack as set forth in claim 6, said head having a port for the escape of fluid from the mid section to the upper section, and a check valve controlling said port and opening responsive to a predetermined reduction of fluid pressure in the upper section below that in the mid section.

9. A vehicle jack comprising an upper hollow cylindrical section carrying means for engaging a sprung portion of a vehicle, a section slidable within said upper section from a raised idle position to a lowered lifting position, a spring reacting between said sections to normally maintain the raised position of the sliding section, means for delivering a pressure fluid to the upper section to react between the two sections for lowering the sliding section, an arm pivoted to said upper section and engageable at one of its ends beneath an unsprung portion of a vehicle to resist sagging of the unsprung portion, and means carried by the sliding section engageable with the opposite end of said arm in a lowered position of the sliding section to maintain the arm in its effective position.

10. A vehicle jack comprising an upper section carrying means for engaging a sprung portion of a vehicle, a lower section reacting against said upper section to downwardly extend such lower section and raise said sprung portion, an arm pivoted on the upper section to maintain an unsprung portion of the vehicle in raised position, and a member fixed on the lower section to retain the arm in effective position, in a downwardly extended position of the lower section.

11. A vehicle jack as set forth in claim 10, said arm being pivoted at opposite sides of said upper section.

12. A vehicle jack as set forth in claim 10, said arm being pivoted at opposite sides of said upper section, and having an apertured end freely slidably engaging said fixed member.

13. A vehicle jack as set forth in claim 10 having a spring reacting between said upper section and the arm to maintain the arm in contact with said unsprung portion of the vehicle.

14. A vehicle jack as set forth in claim 10, said arm projecting beyond the upper section in one direction to take effect on the unsprung portion of the vehicle, and projecting beyond the upper section in the opposite direction for co-action with said fixed member.

15. A vehicle jack comprising an upper hollow cylindrical section, means for attaching such section to a sprung portion of a vehicle, a hollow cylindrical mid-section slidable within the upper section from a raised idle position to a lowered lifting position, said sections having fluid-sealing engagement, the upper section having a by-pass controlled by travel of the mid-section and establishing a fluid delivery to the mid-section upon a predetermined downward actuation of the mid section, a bottom section slidable in and having fluid-sealing engagement with the mid-section and actuable from a raised idle position to a lowered lifting position, and means for delivering a pressure fluid to the upper section to initially react between the upper section and mid-section for lowering the mid-section, and to subsequently react between the mid-section and bottom section for lowering the bottom section.

16. A vehicle jack comprising telescoping upper and lower sections, means for securing said upper section to a sprung portion of a vehicle, the lower section being slidable substantially vertically on the upper section from a raised idle position to a lowered lifting position, and means including an actuating element connected to the lower section for resisting sagging of an unsprung portion of the vehicle when the lower section is in lifting position.

17. In a vehicle jack as set forth in claim 16, a spring resisting lowering of the lower section.

WALTER BEHM.
EARL J. McCLELLAN, Jr.